Jan. 29, 1924. 1,482,070
L. F. DOUGLASS
METHOD AND APPARATUS FOR PRODUCING A PLURALITY OF IMAGES OF SEPARATE
OBJECTS ON A PHOTOGRAPHIC FILM
Filed Aug. 23, 1922
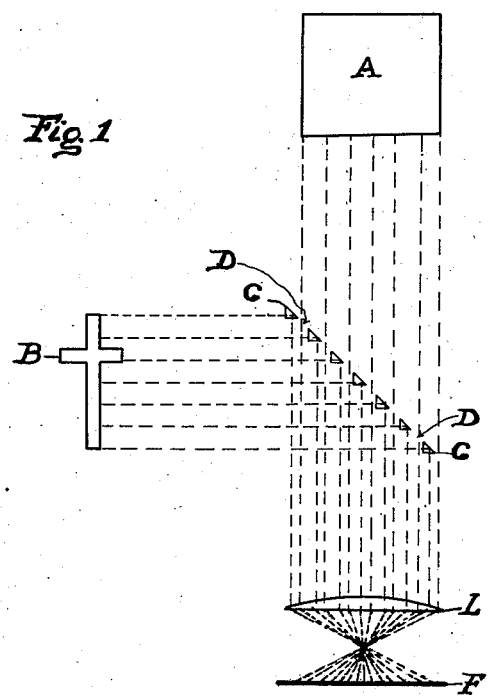
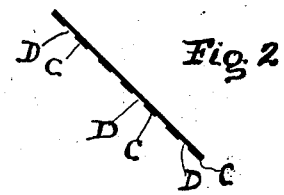
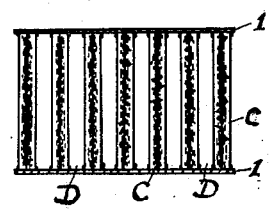
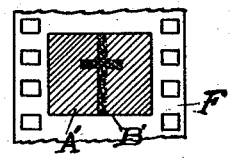
INVENTOR:
Leon F. Douglass
By: JE Frabusco
Attorney.

Patented Jan. 29, 1924.

1,482,070

UNITED STATES PATENT OFFICE.

LEON F. DOUGLASS, OF MENLO PARK, CALIFORNIA.

METHOD AND APPARATUS FOR PRODUCING A PLURALITY OF IMAGES OF SEPARATE OBJECTS ON A PHOTOGRAPHIC FILM.

Application filed August 23, 1922. Serial No. 583,925.

*To all whom it may concern:*

Be it known that I, LEON F. DOUGLASS, a citizen of the United States, and a resident of Menlo Park, in the county of San Mateo and State of California, have invented new and useful Improvements in Methods and Apparatus for Producing a Plurality of Images of Separate Objects on a Photographic Film, of which the following is a specification.

This invention relates to a method and apparatus whereby a plurality of superimposed images of a plurality of separate objects may be simultaneously produced on a single photographic film.

An object of my invention is to provide a novel method and improved apparatus whereby a plurality of images may be produced simultaneously upon a single photographic film or plate.

Another object of this invention is to provide apparatus of the type just characterized which may be readily applied to an ordinary camera without change in its mechanism or construction.

Stated broadly the invention comprises in combination with a sensitized film or plate, and a lens for focusing objects onto said film or plate, a plurality of small light-reflecting elements with intervening spaces between them, positioned to reflect an image of an object through the lens onto the film, and at the same time permit the light rays from another object to proceed directly through the intervening spaces and the said lens onto said film.

Generally stated, I position, on a suitable retaining rack or frame, a number of small 90 degree light-reflecting prisms, so that each is separated longitudinally from the others by an intervening parallel space equal in width to the reflecting surface of each of said prisms.

The said rack or frame is then positioned, with the prisms on it, at an angle of approximately 45 degrees with reference to the camera lens and an object to be photographed. The prisms are so positioned on the rack or frame that they reflect an image of the said object through a camera lens onto a photographic film, and at the same time permit the light rays from another object, positioned in front of said lens, to proceed between the spaces separating said prisms, through said lens onto said film. By a single exposure two images of two separate objects may be produced simultaneously upon a single sensitized film or plate.

The invention is capable of being carried out in a variety of ways, and of receiving a variety of mechanical expressions, two of which have been illustrated on the accompanying drawings, but it is to be understood that the drawings are for purposes of illustration only, and are not to be construed as a definition of the limits of the invention, reference being had to the appended claims for that purpose.

In said drawings:

Fig. 1 is a diagrammatic view illustrating the relative arrangement of the objects to be photographed, the various light reflecting elements, the camera lens and the photographic film;

Fig. 2 is a sectional view of a piece of clear glass upon which are strips of silver, the same being used in a manner similar to the reflecting prisms, shown in Fig. 1;

Fig. 3 is a front view of the light reflecting elements and their holding frame or rack;

Fig. 4 is a diagrammatic fragment of a photographic film upon which two images of two separate objects are produced in a superimposed position.

Referring particularly to Fig. 1, an object B, is positioned at an angle of approximately 90 degrees with reference to the axis of the lens L, which may be the lens of any suitable camera. Another object A, which is also to be photographed, is positioned directly in front of the lens L. A plurality of small 90 degree light-reflecting prisms, C, in the form shown in Figs. 1 and 3, attached by suitable means to a holding frame or rack 1 with intervening parallel spaces D between each of them, which said spaces are equal in width to the reflecting surface of each, are interposed in the path of the light rays emanating from object B; and are positioned in such a manner that each will reflect a pencil of light from said object through lens L onto a sensitized film F, and at the same time permit a pencil of light from object A to proceed between each of the intervening spaces D, through lens L to film F.

The light rays from objects B and A upon their striking the sensitized film F, produce images B' A' of said objects in a superimposed position. The image B' is somewhat less pronounced than image A', owing to the fact that the rays of light producing it are reflected, thereby losing a part of their intensity.

In carrying out the present invention, it is not necessary that prisms be employed as light reflecting elements, as I have found that silvered strips equal in width, positioned in the same manner as are the prisms, serve to produce satisfactory results. In the form shown in Fig. 2, a clear piece of glass with silvered parallel strips upon it, each strip being separated by a space equal in width to the silvered strip, produces satisfactory results. The term "light-reflecting element" as used herein is therefore to be construed as generic to light reflecting mirrors as well as prisms.

While the embodiments of the invention illustrated on the drawings have been described with considerable particularity, it is to be expressly understood that the invention is not restricted thereto as the same may be carried out in a variety of ways and embodied in a variety of forms some of which will now readily suggest themselves to those skilled in the art. I do not desire to be limited to any particular kind or form of photography in carrying out my invention, as it is apparent that the same may be used in connection with both still and motion photography or cinematography. Nor am I limited to the use of any particular character of sensitized element by which the negative is to be formed and the term "film" as employed in the claims is to be construed as generic to plates or other suitable sensitized elements.

Although I have illustrated and described this invention as referring to the photographing of "objects," it is to be expressly understood that the term "object" is to be considered as referring to the one object, a group of objects, or a scene from which a pencil of light is to be directed on a sensitized film, or its equivalent, separately and independently in the directioning of the pencil of light from another so called "object" composed of one or more elements.

Having now described my invention what I claim is:

1. The method of producing a plurality of separate images of a plurality of separate objects on a sensitized photographic film which comprises, reflecting an image of one of said objects through a lens onto said film by means of a plurality of light-reflecting elements interposed in the path of a plurality of pencils of light rays from said object, and simultaneously allowing a plurality of pencils of light rays from another of said objects to proceed between said light reflecting elements, through said lens and onto said film.

2. The method of producing on a photographic film a superimposed image of an object over an image of another object which comprises reflecting a plurality of light rays from one of said objects through a lens onto said film by means of a plurality of separated light reflecting elements positioned in the path of said light rays, and allowing a plurality of light rays from the other of said objects to proceed between said light-reflecting elements, through said lens onto said film.

3. The method of producing a plurality of images of a plurality of objects on a sensitized photographic film which comprises, reflecting an image of one of said objects through a lens onto said film by means of a plurality of separated light-reflecting elements interposed in the path of a plurality of light rays from said object, and allowing a plurality of light rays from another of said objects to proceed between said separated light-reflecting elements, through said lens onto said film.

4. The method of producing a plurality of images of a plurality of objects on a sensitized film which comprises, reflecting an image of one of said objects through a lens onto said film by means of a plurality of separated small light-reflecting elements interposed in the path of a plurality of light rays from said object, and allowing a plurality of light rays from another of said objects to proceed directly through said lens onto said film.

5. Means for producing a plurality of images of a plurality of objects upon a sensitized film, in combination with a lens, a plurality of separated light reflecting elements positioned to both reflect the image of one object through said lens onto said film and permit the light rays from another object to proceed directly through said lens onto said film.

6. In combination with a lens, a plurality of light directing elements positioned adjacent said lens at a uniform predetermined angle to the axis thereof and adapted to both direct an image of an object through said lens onto said film, and simultaneously allow the light rays from another object to proceed directly through said lens onto said film.

7. In a device of the class described, the combination of a lens, a plurality of light directing elements positioned to direct a plurality of light rays from an object through said lens onto said film and at the same time permit a plurality of light rays from another object to proceed directly through said lens onto said film.

8. In a device of the class described, the combination of a lens, a plurality of separated light-reflecting elements positioned adjacent said lens and at a uniform predetermined oblique angle to the axis thereof, whereby the light rays from an object may be reflected through said lens onto said film simultaneously with the passing of the light rays from another object between said light-reflecting elements through said lens onto said film.

LEON F. DOUGLASS.